(12) United States Patent
Brown et al.

(10) Patent No.: US 11,765,028 B2
(45) Date of Patent: *Sep. 19, 2023

(54) ASSET PACKAGING FOR MULTIPLE APPLICATIONS SHARING COMMON ASSETS

(71) Applicant: Aristocrat Technologies Australia Pty Limited, Las Vegas, NV (US)

(72) Inventors: Jody S. Brown, Austin, TX (US); Christopher G. Fandrich, Austin, TX (US); Sanjay Kumar, Las Vegas, NV (US)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 0 days.

This patent is subject to a terminal disclaimer.

(21) Appl. No.: 18/147,329

(22) Filed: Dec. 28, 2022

(65) Prior Publication Data
US 2023/0135202 A1    May 4, 2023

Related U.S. Application Data

(63) Continuation of application No. 17/249,984, filed on Mar. 19, 2021, now Pat. No. 11,546,209, which is a continuation of application No. 16/230,436, filed on Dec. 21, 2018, now Pat. No. 10,999,136.

(51) Int. Cl.
*G06F 15/16* (2006.01)
*H04L 41/0806* (2022.01)
*H04L 41/0896* (2022.01)
*G07F 17/32* (2006.01)
*H04L 41/0893* (2022.01)

(52) U.S. Cl.
CPC ...... *H04L 41/0806* (2013.01); *G07F 17/3262* (2013.01); *G07F 17/3293* (2013.01); *H04L 41/0893* (2013.01); *H04L 41/0896* (2013.01)

(58) Field of Classification Search
None
See application file for complete search history.

(56) References Cited

U.S. PATENT DOCUMENTS 7,766,749 B2 * 8/2010 Giobbi .................... G07F 17/32
463/30
8,568,227 B2 * 10/2013 Lawrence .............. G07F 17/32
463/31

(Continued)

OTHER PUBLICATIONS

Office Action dated Sep. 17, 2020 for U.S. Appl. No. 16/230,436 (pp. 1-26).

(Continued)

*Primary Examiner* — Atta Khan
(74) *Attorney, Agent, or Firm* — Weaver Austin Villeneuve & Sampson LLP

(57) ABSTRACT

Systems and techniques for providing more efficient remote provisioning of assets for software applications are provided. Such systems and techniques allow for more flexible distribution of such assets while reducing bandwidth consumption and storage requirements on provisioned devices and reducing delay time from requesting a software application on a remote device and then having the remote device actually execute the requested software application.

18 Claims, 10 Drawing Sheets

(56) References Cited

U.S. PATENT DOCUMENTS

| | | | |
|---|---|---|---|
| 8,758,119 B1* | 6/2014 | Bronstein Bendayan | ............... A63F 13/35 463/25 |
| 2003/0224858 A1 | 12/2003 | Yoseloff | |
| 2006/0074750 A1* | 4/2006 | Clark | ............ H04N 21/26208 348/E7.072 |
| 2008/0045346 A1* | 2/2008 | Nelson | ............ G07F 17/3227 463/43 |
| 2008/0318658 A1* | 12/2008 | Sylla | ............ G07F 17/32 463/16 |
| 2009/0124392 A1* | 5/2009 | Ruppert | ............ G07F 17/3227 463/42 |
| 2009/0156282 A1 | 6/2009 | Mak | |
| 2010/0333083 A1 | 12/2010 | Chancey | |
| 2013/0084991 A1* | 4/2013 | LeMay | ............ G07F 17/3206 463/42 |
| 2013/0123018 A1 | 5/2013 | Sareli | |
| 2013/0263103 A1 | 10/2013 | Choudhury | |

OTHER PUBLICATIONS

Notice of Allowance dated Jan. 7, 2021 for U.S. Appl. No. 16/230,436 (pp. 1-21).
Office Action dated Mar. 19, 2020, for U.S. Appl. No. 16/230,436 (pp. 1-24).
Office Action (Non-Final Rejection) dated Nov. 12, 2021 for U.S. Appl. No. 17/249,984 (pp. 1-35).
Office Action (Notice of Allowance and Fees Due (PTOL-85)) dated Sep. 9, 2022 for U.S. Appl. No. 17/249,984 (pp. 1-10).

* cited by examiner

| Asset | Sets of Associated Applications |
|---|---|
| A | 1,2,3,4,5,6,N |
| B | 1,2,4,6,N |
| C | 1,3,4 |
| D | 1,2,3,4,5,6,N |
| E | 1,2,3,4,5,6,N |
| F | 1 |
| G | 1,2,4,6,N |
| H | 1,4,N |
| I | 1,2,4,6,N |
| J | 1,4,N |
| K | 1,2,3,4,5,6,N |
| L | 4,5,6,N |
| M | 2,3,5 |
| N | 2,3,5 |
| O | 4,5,6,N |
| P | 2 |
| Q | 3,4,5,N |
| R | 1,3,4 |

FIG. 4

| Application | Asset Sets |
|---|---|
| 1 | 1,2,5,6,8 |
| 2 | 1,2,8,9 |
| 3 | 1,3,5,8 |
| 4 | 1,2,3,4,5,6 |
| 5 | 1,3,4,8 |
| 6 | 1,2,4 |
| N | 1,2,3,4,6 |

FIG. 6

ASSET PACKAGING FOR MULTIPLE APPLICATIONS SHARING COMMON ASSETS

RELATED APPLICATION

This application is a continuation application under 35 U.S.C. § 120 of U.S. patent application Ser. No. 17/249,984, titled "ASSET PACKAGING FOR MULTIPLE APPLICATIONS SHARING COMMON ASSETS," filed Mar. 19, 2021, and issued as U.S. Pat. No. 11,546,209, on Jan. 3, 2023, which is itself a continuation of U.S. patent application Ser. No. 16/230,436, titled "ASSET PACKAGING FOR MULTIPLE APPLICATIONS SHARING COMMON ASSETS," filed Dec. 21, 2018, and issued as U.S. Pat. No. 10,999,136 on May 4, 2021, both of which are hereby incorporated by reference herein in their entireties and for all purposes.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

SUMMARY

Modern electronic gaming systems may sometimes offer a variety of different games, e.g., game applications, for a player to select between to play. Additionally, many electronic gaming machine manufacturers may offer a variety of games for play through non-traditional avenues, e.g., through remote play on smart phones or tablet devices. In such instances, such games may include mobile versions of games that are available on electronic gaming machines and/or games that are not available on electronic gaming machines, e.g., games that may be being developed for electronic gaming machines and for which it may be desirable to obtain marketing or customer-receptivity data, games that have been developed for mobile device play from the ground up and that are not intended to be used in an electronic gaming machine, and so forth. Such mobile versions of games may, in some instances, be enabled to allow for the games to be wagering games, whereas in other instances, such games may be "free" play games, i.e., ones in which no actual money may be won or lost.

The present disclosure is directed at systems and techniques for more efficiently provisioning assets for a software application, e.g., a game software application. Assets, in the context of this application, refer to data structures that are used by a software application. Assets may include, for example, code libraries, image data, video data, audio data, audiovisual data, fonts (including textures therefor, kern tables, ligature definitions, etc.), texture information, shader information, haptic feedback information (such as vibration or movement profiles), and so forth. In many instances, an asset may be common to a number of software applications, e.g., each software application released by a common publisher may feature a common "splash" screen logo for the publisher. In other examples, the degree to which a particular asset is shared between applications may vary—some assets may be shared between only some applications provided by a publisher, and some other assets may be shared not at all, i.e., be specific to one and only one application provided by a publisher.

For publishers with large catalogues of software applications, managing assets more intelligently may allow for significant improvements in bandwidth consumption necessary to provision remote devices with such applications, as well as the efficiency with which such assets are stored on such remote devices and the rapidity with which such applications may be rendered usable on a remote device after a user of such a remote device has requested access to such a software application.

In the systems and techniques discussed herein, a population of software applications that may share one or more assets in common may be identified. Assets of software applications in the population of software applications may then be evaluated to determine or identify all of the software applications in the population of software applications that are associated with that asset, i.e., that may be designed to access and/or use that asset under certain conditions. After identifying the software applications associated with each such asset that is evaluated, the assets that belong to identical sets of software applications may be packaged or consolidated together into a single asset library. After asset libraries have been prepared for a population of software applications, they may then be used to provision devices requesting such software applications.

These techniques, and the benefits realized therefrom, are discussed in more depth below, but may include the following implementations (although it should be understood that the present disclosure is not limited to only these implementations, and that other implementations will be evident from the disclosure).

In some implementations, a system may be provided that includes one or more processors and one or more storage devices. In such a system, the one or more processors and the one or more storage devices may be operably connected, and the one or more storage devices may store computer-executable instructions for controlling the one or more processors to: obtain a plurality of assets, each asset associated with one or more software applications of a plurality of different software applications; determine, for each of the assets, a set of one or more of the software applications with which that asset is associated; determine a plurality of sets of assets, each set of assets including one or more assets that are all associated with the same set of one or more of the software applications; and package the one or more assets for each set of assets into a corresponding asset library.

In some implementations of the system, the one or more storage devices may further store computer-executable instructions for further controlling the one or more processors to: receive a first indication from a remote device of a selected software application of the plurality of different software applications; determine a set of the asset libraries, wherein the asset libraries that are in the set of the asset libraries each include one or more of the assets that are associated with the selected software application; and prioritize transmission to the remote device of one or more of the asset libraries in the set of the asset libraries over transmission to the remote device of the asset libraries that are not in the set of the asset libraries.

In some implementations of the system, the one or more storage devices may further store computer-executable instructions for further controlling the one or more processors to: receive a second indication from the remote device of asset libraries that are stored on the remote device; and transmit, to the remote device, the asset libraries in the set of the asset libraries that are not indicated by the second indication as being stored on the remote device.

In some implementations of the system, the one or more storage devices may further store computer-executable instructions for further controlling the one or more processors to transmit, to the remote device, the asset libraries in the set of the asset libraries that are not indicated by the second indication as being stored on the remote device and that are associated with one or more of the software applications other than the selected software application.

In some implementations of the system, the one or more software applications may be games and each asset may represent graphics, textures, audio, text, font information, video, or haptic feedback definitions.

In some implementations of the system, the computer-executable instructions for controlling the one or more processors to package the one or more assets for each set of assets into the corresponding asset library may include computer-executable instructions for controlling the one or more processors to compress the one or more assets as part of the packaging of the one or more assets.

In some implementations, a non-transitory, computer-readable storage medium may be provided that stores computer-executable instructions for controlling one or more processors to: obtain a plurality of assets, each asset associated with one or more software applications of a plurality of different software applications; determine, for each of the assets, a set of one or more of the software applications with which that asset is associated; determine a plurality of sets of assets, each set of assets including one or more assets that are all associated with the same set of one or more of the software applications; and package the one or more assets for each set of assets into a corresponding asset library.

In some implementations, the non-transitory, computer-readable storage medium may store further computer readable instructions for further controlling the one or more processors to: receive a first indication from a remote device of a selected software application of the plurality of different software applications; determine a set of the asset libraries, wherein the asset libraries that are in the set of the asset libraries each include one or more of the assets that are associated with the selected software application; and prioritize transmission to the remote device of one or more of the asset libraries in the set of the asset libraries over transmission to the remote device of the asset libraries that are not in the set of the asset libraries.

In some implementations, the non-transitory, computer-readable storage medium may store further computer readable instructions for further controlling the one or more processors to: receive a second indication from the remote device of asset libraries that are stored on the remote device; and transmit, to the remote device, the asset libraries in the set of the asset libraries that are not indicated by the second indication as being stored on the remote device.

In some implementations, the non-transitory, computer-readable storage medium may store further computer readable instructions for further controlling the one or more processors to transmit, to the remote device, the asset libraries in the set of the asset libraries that are not indicated by the second indication as being stored on the remote device and that are associated with one or more of the software applications other than the selected software application.

In some implementations, the non-transitory, computer-readable storage medium, the one or more software applications may be games and each asset may represent graphics, textures, audio, text, font information, video, or haptic feedback definitions.

In some implementations, the non-transitory, computer-readable storage medium, the computer-executable instructions for controlling the one or more processors to package the one or more assets for each set of assets into the corresponding asset library may include computer-executable instructions for controlling the one or more processors to compress the one or more assets as part of the packaging of the one or more assets.

In some implementations, a method may be provided that includes: obtaining a plurality of assets, each asset associated with one or more software applications of a plurality of different software applications; determining, for each of the assets, a set of one or more of the software applications with which that asset is associated; determining a plurality of sets of assets, each set of assets including one or more assets that are all associated with the same set of one or more of the software applications; and packaging the one or more assets for each set of assets into a corresponding asset library.

In some implementations of the method, the method may further include receiving a first indication from a remote device of a selected software application of the plurality of different software applications; determining a set of the asset libraries, wherein the asset libraries that are in the set of the asset libraries each include one or more of the assets that are associated with the selected software application; and prioritizing transmission to the remote device of one or more of the asset libraries in the set of the asset libraries over transmission to the remote device of the asset libraries that are not in the set of the asset libraries.

In some implementations of the method, the method may further include: receiving a second indication from the remote device of asset libraries that are stored on the remote device; and transmitting, to the remote device, the asset libraries in the set of the asset libraries that are not indicated by the second indication as being stored on the remote device.

In some implementations of the method, the method may further include transmitting, to the remote device, the asset libraries in the set of the asset libraries that are not indicated by the second indication as being stored on the remote device and that are associated with one or more of the software applications other than the selected software application.

In some implementations of the method, the one or more software applications may be games and each asset may represent graphics, textures, audio, text, font information, video, or haptic feedback definitions.

In some implementations of the method, packaging the one or more assets for each set of assets into the corresponding asset library may include compressing the one or more assets as part of the packaging.

BRIEF DESCRIPTION OF THE DRAWINGS

FIG. 4 is a table showing, for each asset indicated in FIG. 3, the set of software applications associated therewith.

FIG. 6 is a table showing which asset sets are associated with each software application.

The Figures are provided for explanatory purposes only and should not be viewed as limiting the disclosure to the implementations depicted; other implementations will be apparent from the discussion herein and are within the scope of this disclosure.

DETAILED DESCRIPTION

Figure 1:
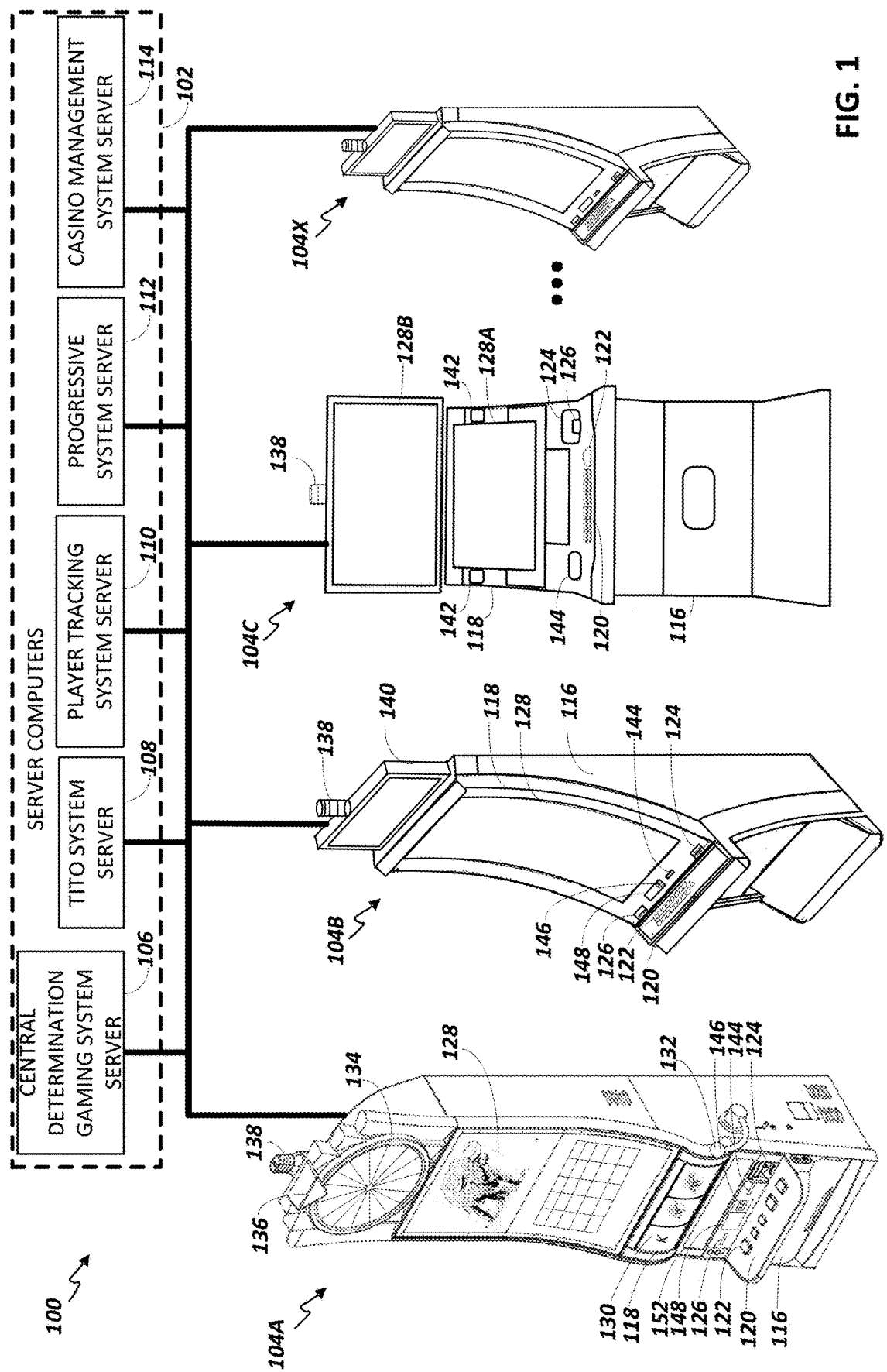
FIG. 1 is an exemplary diagram showing several EGMs networked with various gaming related servers.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console, although such devices may require specialized software and/or hardware to comply with regulatory requirements regarding devices used for wagering or games of chance in which monetary awards are provided.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, in one or more embodiments, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 154 which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game.

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are used to generate and track unique bar-codes or other indicators printed on tickets to allow players to avoid the use of bills and coins by loading credits using a ticket reader and cashing out credits using a ticket-out printer 126 on the gaming device 104A. The gaming machine 104A can have hardware meters for purposes including ensuring regulatory compliance and monitoring the player credit balance. In addition, there can be additional meters that record the total amount of money wagered on the gaming machine, total amount of money deposited, total amount of money withdrawn, total amount of winnings on gaming device 104A.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
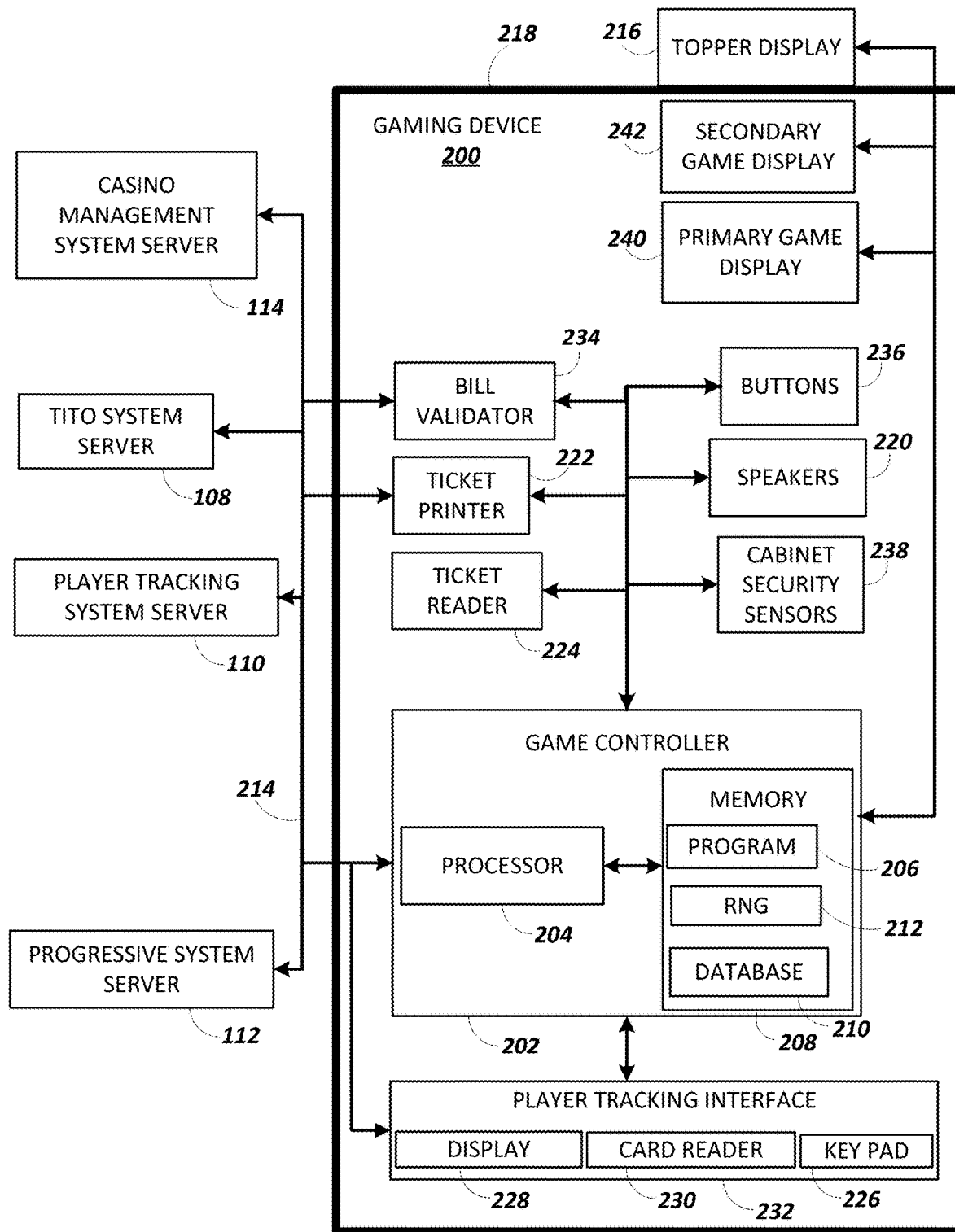
FIG. 2 is a block diagram showing various functional elements of an exemplary EGM.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 154 which opens to provide access to the interior of the gaming device 104B. The main or service door 154 is typically used by service personnel to refill the ticket-out printer 126 and collect bills and tickets inserted into the bill validator 124. The main or service door 154 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator. In some embodiments, example gaming device 104C may also include speakers 142 to output various audio such as game sound, background music, etc.

Many different types of games, including mechanical slot games, video slot games, video poker, video blackjack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance.

Alternatively, a game instance (i.e. a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204.

The gaming device 200 may include a topper display 216 or another form of a top box (e.g., a topper wheel, a topper screen, etc.) which sits above cabinet 218. The cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. Ticket printer 222 may be used to print tickets for a TITO system server 108. The gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

As discussed earlier, software applications, e.g., gaming software applications, may be distributed to remote devices in some cases, e.g., for casual or online play via a tablet, smartphone, or other device. Various techniques for packaging assets for such software applications, such as are disclosed herein, may be used to provide for more efficient use of transmission bandwidth and available storage on the remote device. These techniques, and aspects thereof, are discussed below with respect to the remaining Figures. While these examples are provided in the context of gaming software applications, it will be recognized that such techniques may be applied in the context of any group of software applications that may share assets in common, and the scope of this disclosure is to be viewed as encompassing both gaming and non-gaming software application implementations.

Figure 3:
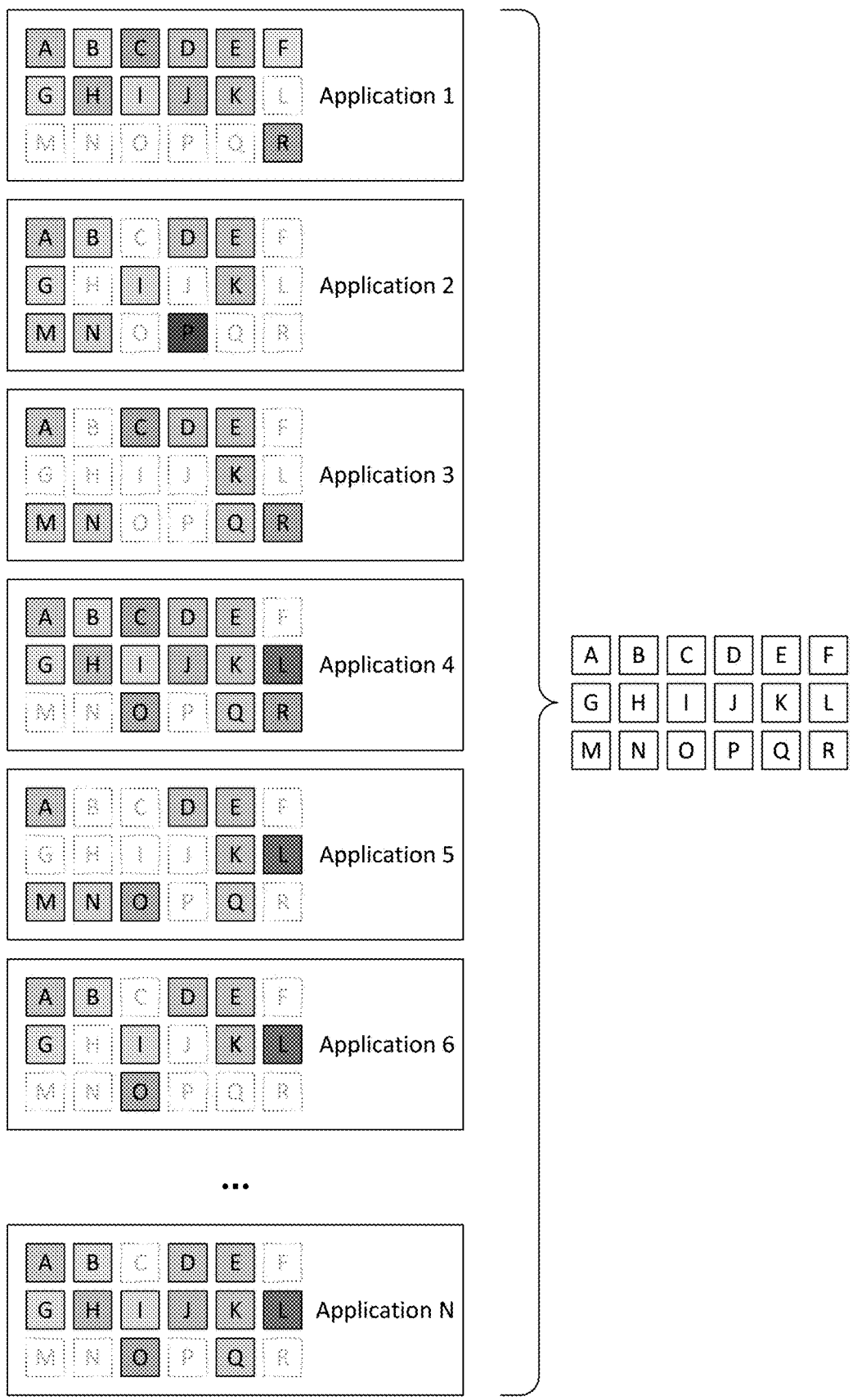
FIG. 3 depicts an example population of software applications with various assets referenced by each software application.

FIG. 3 depicts an example population of software applications with various assets referenced by each software application. Such software applications may, for example, be various types of slot-machine games or other games of chance. For example, Aristocrat Technologies Australia Pty Ltd.'s Product Madness subsidiary offers a mobile platform application called "Heart of Vegas" that allows for play of over 80 different slot machine games published by Aristocrat Technologies Australia Pty Ltd. and its various subsidiaries and studios. Each such slot machine game may be considered to be a separate software application. It should be understood that the term "software application" is used herein to refer to both free-standing software applications, e.g., applications where the main application code is not in the same executable or executables as the main application code for other applications, as well as to software applications that may be part of a larger executable, e.g., applications where the main application code for multiple applications may be included in a common executable, but only portions of that code relevant to a particular game application may be executed at one time.

In the example of FIG. 3, a plurality of software applications are represented by rectangular boxes; the number of such applications may vary, as indicated by the ellipsis and the use of "Application N," although in this example, there are only seven total software applications discussed. As noted earlier, a much larger number of software applications may be subject to such techniques, e.g., 80+ software applications—there is theoretically no limit on the number of such applications that may be processed according to the techniques discussed herein, and the benefits accruing to the use of such techniques may actually be enhanced for larger and larger numbers of software applications. The number of software applications that may be processed according to the techniques discussed herein may also be less than the number depicted in FIG. 3, and may, for example, range as low as six, five, four, three, or two software applications.

As shown in FIG. 3, each software application may be associated with a number of assets, which are schematically represented in FIG. 3 by squares with letters in them. In this example, a fixed population of eighteen assets (assets A-R, shown at right) is represented in each software application, with the assets actually from that fixed population of assets that are actually associated with each software application being represented by the squares representing those assets having solid, black borders. Assets in the population of assets that are not associated with a particular software application are shown in light gray, dotted-border squares.

For example, Application 1 of FIG. 3 is associated with assets A-K and R, which are shown in squares with solid black borders within Application 1, but is not associated with assets L-Q, which are shown as having squares with light grey, dotted borders within Application 1. Similarly, Application 2 of FIG. 3 is associated with assets A, B, D, E, G, I, K, M, N, and P, but is not associated with assets C, F, H, J, L, O, Q, and R. Application 3 of FIG. 3 is associated with assets A, C-E, K, M, N, Q, and R, but is not associated with assets B, F-J, L, O, and P. Application 4 is associated with assets A-E, G-L, O, Q, and R, but not with assets F, M, N, and P. Application 5 is associated with assets A, D, E, K-O, and Q but not with assets B, C, F-J, P, and R. Application 6 is associated with assets A, B, D, E, G, I, K, L, and O, but not with assets C, F, H, J, M, N, and P-R. Finally, Application N is associated with assets A, B, D, E, G-L, O, and Q but not with assets C, F, M, N, P, and R.

Once the assets for each software application are known, e.g., after development of the software application has been completed and the assets finalized, the population of assets across the plurality of software applications may be evaluated to determine which software applications of the plurality of software applications are associated with each asset. For example, information identifying each asset for each software application may be added to a data structure, along with information identifying which software application(s) that asset is associated with. If an asset for a software application is already in the data structure due to having been added earlier due to an association with another software application, then the existing record for that asset in the data structure may simply be updated to reflect the association with the additional software application. In some implementations, the assets of different software applications that are shared between software applications may be manually identified, e.g., by an individual or individuals that know that those assets are shared between those software applications. In other implementations, such assets may be identified through other preexisting data that indicates that they are shared between those software applications, e.g., there may be information in the development environment for those software applications that indicates that those assets are sourced from a common source file, and that information may be used to establish that such assets are shared between those software applications.

In yet further implementations, other techniques may be used to identify "shared" assets. For example, in one technique, each of the assets for each software application of a plurality of software applications may be analyzed to extract various information, e.g., filename, file type, size, hash value, etc. Assets with identical filenames, file types, sizes, and hash values may be viewed as being shared between the software applications with which they are associated. In some implementations, such assets may be identified as being "shared" based on a subset of such metadata matching, e.g., if the asset file size and the asset hash value are identical, this may be viewed as indicating a shared asset even if the filenames of those assets are different. In such instances, a data structure may be created that includes information identifying, for such shared assets, what the various "aliases" are for each asset, e.g., information indicating, for example, that a particular asset is titled "background.jpg" for software applications 1, 2 and 3 and "bkgrnd.jpg" for software applications 4, 5, 6, and N. Such information may later be used to allow packaged assets to be properly retrieved by the respective associated software applications.

By way of example, in some implementations, each software application may store the assets it references in a single, large data file in a file system (or several such data files, each containing multiple assets). The data file, or a file associated therewith, may include a lookup table or other index that associates a particular reference to that asset with the asset's location in the large data file or files. Each time the software application uses a particular asset, it may retrieve the asset based on the associated reference. In some such implementations, the reference used for each asset may, for example, be a hash value that is calculated based on the data for that asset. In such instances, the hash value may provide a reference to the corresponding asset that is, in effect, determined by the content of the asset itself; the reference is thus not arbitrary and would be identical in each software application that used that asset (assuming the same hashing algorithm is used to generate the associated hash value for each asset). Such hash values would also provide a generally unique identifier for each asset; if assets have associated hash values that are identical, then an assumption may be made that those assets are actually the same (it is acknowledged that there may be multiple data structures that could generate the same hash value with a given hash function, but the chances of this happening for an practically useful set of assets is, in a practical sense, nil). Thus, for example, the assets in multiple multi-asset data files for multiple software applications may be analyzed to determine what the associated hash value for each asset is and the hash values may then be used to identify which assets in the data files are common to different subsets of those software applications; those same hash values may also be used within the software application itself to refer to each asset, thereby bypassing the need to "translate" a software application's reference to a particular asset into a format that is used to refer to that asset in a shared asset library.

FIG. 4 is a table showing, for each asset indicated in FIG. 3, the set of software applications associated therewith. As can be seen, assets A, D, E, and K are associated with all seven software applications of FIG. 3, whereas assets F and P are each associated with different single software applications. The other assets are each associated with varying numbers of the software applications. Once the information regarding the software applications with which each asset is associated has been collected, then the assets may be grouped into sets of assets based on which assets are associated with the same sets of software applications.

Figure 5:
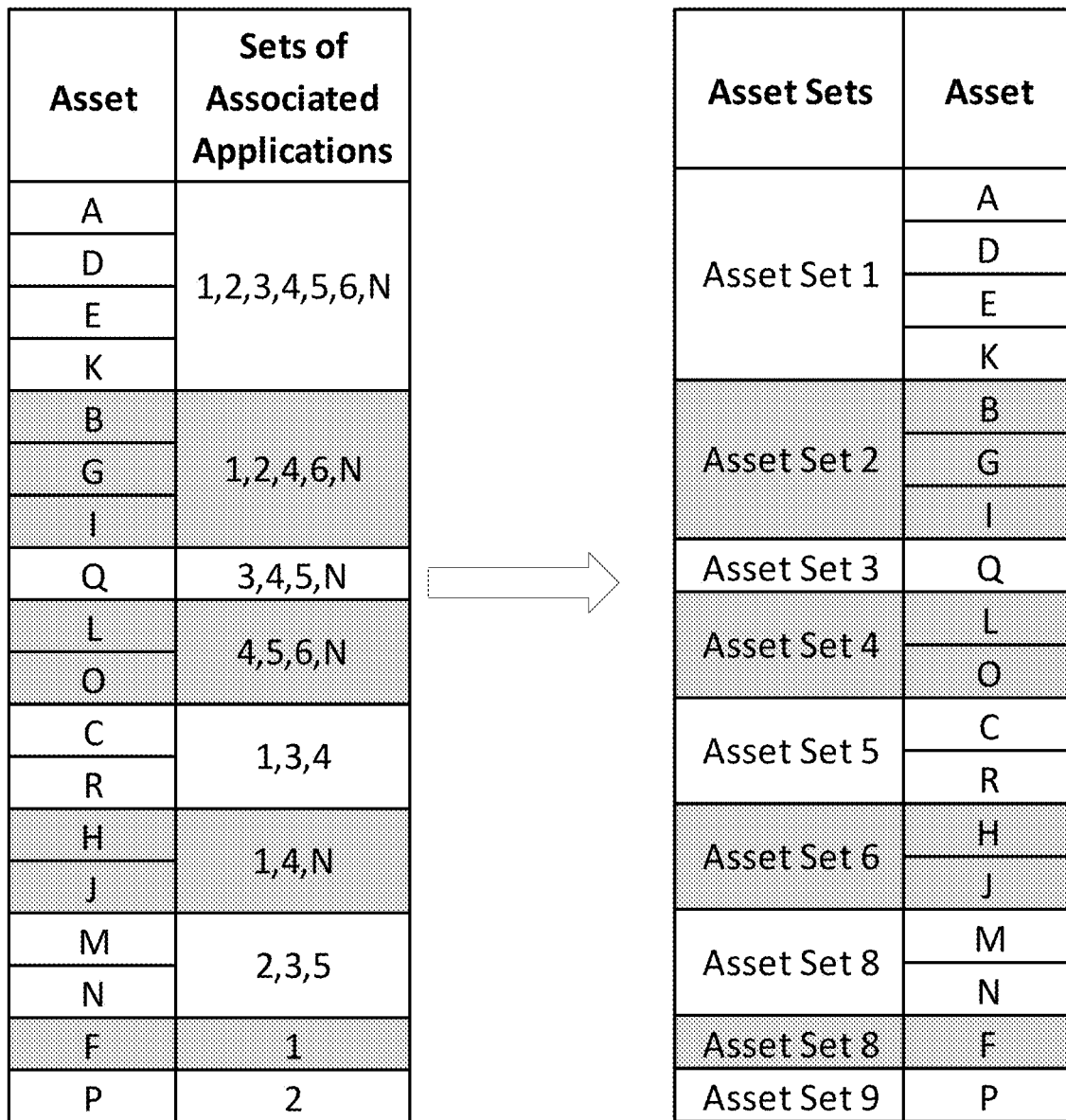
FIG. 5 is a table showing the assets of the table in FIG. 4 grouped together by common sets of associated software applications, as well as a table of those same groups of assets arranged into different asset sets.

FIG. 5 is a table showing the assets of the table in FIG. 4 grouped together by common sets of associated software applications, as well as a table of those same groups of assets arranged into different asset sets. For example, assets A, D, E, and K, as noted earlier, are each associated with all seven of the example software applications. Assets B, G, and I are each associated with the same subset of the software applications, i.e., the software applications 1, 2, 4, 6, and N. Asset Q a subset of one asset, is associated with the software applications 3, 4, 5, and N, and assets F and P are, respectively, associated with software application 1 and 2. Assets L and O are both associated with software applications 4-N, whereas assets C and R are both associated with software applications 1, 3, and 4. Assets H and J are both associated with software applications 1, 4, and N, and assets M and N are both associated with software applications 2, 3, and 5. These groups of assets may form a plurality of corresponding sets of assets, as set forth in the table at right in FIG. 5, each of which may be "packaged" together for distribution; such sets of assets may also be referred to as "asset libraries" herein. Such packaging may, for example, simply consist of logically grouping the assets together for transmission (but otherwise maintaining them as separate files) but may, in many implementations, involve packaging the assets together in a single file (or into multiple files that are lesser in number than the starting number of asset files) to allow for easier download and more efficient disk storage.

In some instances in which the assets are packaged together in a single file or a lesser number of files, the assets may be subjected to a compression technique prior to such packaging. In such implementations, any suitable compression technique may be used, as desired, to provide such a compressed asset package. Depending on the nature of the assets, either lossless or lossy compression techniques may be used in such implementations. For example, if the assets are art-based or audio-based assets, then a lossy compression technique may be acceptable for use, as the resulting graphical or audio content will be still be recognizable and may simply be of a lower, although still serviceable, quality. However, if the assets in question are, for example, code libraries, data tables, etc., that may require exact adherence to the original source file, then a lossy compression technique would not be suitable and lossless compression would be used instead. Various examples of lossless compression techniques that may be used include, for example, Huffman coding, arithmetic coding, run-length coding, prediction by partial matching, bzip2, Lempel-Ziv compression, LZ77, LZ78, DEFLATE, Lempel-Ziv-Markhov chain coding, Lempel-Ziv-Oberhumer coding, Lempel-Ziv-Storer-Szymanski coding, Lempel-Ziv-Welch coding, etc.

Compression techniques generally achieve greater and greater compression efficiency the larger the data set to be compressed is, as the larger the dataset, the more opportunities there are to identify duplicate data segments and compress them via a compression algorithm.

Once each set of assets has been identified, as discussed above with respect to FIG. 5, then a manifest may be generated for the software applications indicating which sets of assets (or which asset libraries) are associated with each software application. When a request is made to provide a particular software application or applications, then the manifest may be used to identify which sets of assets or asset libraries are associated with those software applications. FIG. 6 is a table showing which asset sets are associated with each software application, and provides an example of such a manifest for the software application ecosystem of FIG. 3.

Various specific implementations of the techniques discussed above are extrapolated on in more depth below with reference to FIGS. 7 through 9.

Figure 7:
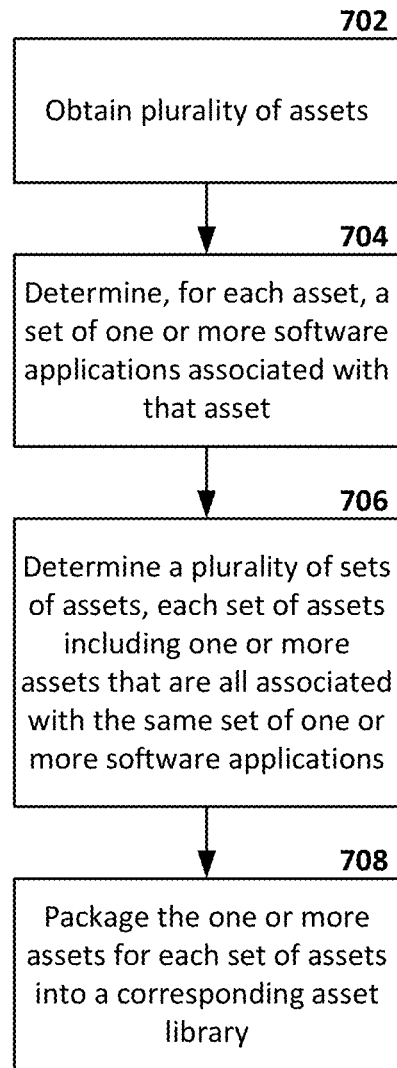
FIG. 7 is a flow diagram for one technique of packaging assets.

FIG. 7 is a flow diagram for one technique of packaging assets. In block 702, a plurality of assets may be obtained or identified (if already obtained). Each such asset may be associated with one or more software applications of a plurality of software applications. The assets may, for example, be multimedia content assets, such as audio data, graphical image data, animated/motion/video image data, three-dimensional object data (such as object models for various three-dimensional constructs), motion path data for animating three-dimensional objects, shader information, or other information that may be primarily used to provide audio and/or visual output for a software application. The assets may also include content such as shared code libraries, e.g., communications interface libraries, random number generator libraries, etc. that may be used to provide various types of common functionality in the software applications.

In block 704, a determination may be made for each asset as to which software applications are associated therewith. As discussed earlier, this determination may be made in a number of different ways, e.g., manually, using pre-existing information, or by individually inspecting each asset and making a determination as to whether that asset correlates with the asset(s) of another software application(s).

In block 706, which may be performed after block 704, a determination may be made as to the composition of one or more sets of assets by identifying assets that are associated with the identical sets of software applications and grouping them together into corresponding sets of assets. Once the assets have been grouped into the sets of assets, the technique may proceed to block 708, in which each set of assets may be packaged into a corresponding asset library, which may then be used for distribution purposes, e.g., downloading to remote devices.

The above technique describes, at a high level, various operations that may be performed to package assets in a way that reduces or eliminates possible duplication of assets that are sent to, or stored on, a single remote device. It is in the remote device context where advantages conferred by the techniques and systems discussed herein may most readily be realized, although some such advantages may also be apparent in other contexts as well. The following discussion explores the context of provisioning of remote devices in view of the packaging techniques discussed above.

Figure 8:
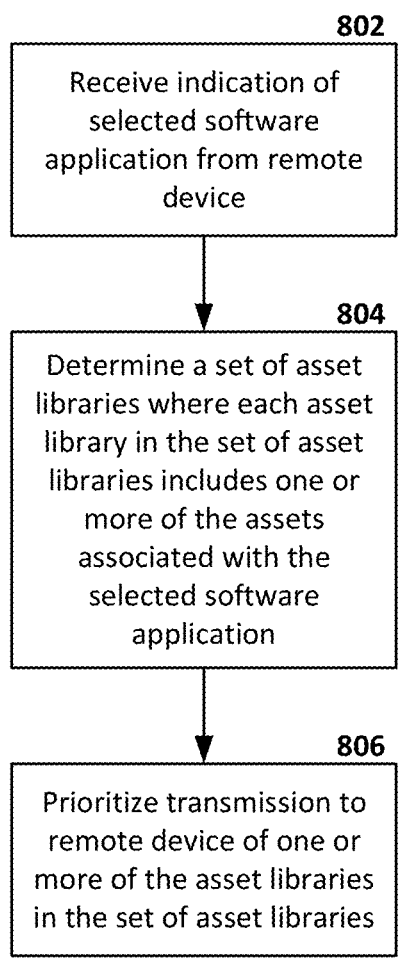
FIG. 8 is a flow diagram for a technique for providing packaged assets to a remote device.

FIG. 8 is a flow diagram for a technique for providing packaged assets to a remote device. In block 802 of FIG. 8, an indication may be received from a remote device of a selected software application, e.g., a particular software application of the plurality of software applications that a user of the remote device would like to use. For example, a user of the remote device may have installed a "hub" application, such as the Heart of Vegas application discussed earlier, that allows for play of a wide variety of different gaming software applications. Such a hub software application may not, in its initial installed form, allow for the play of all (or perhaps even any) of the gaming software applications and may need to download assets for those gaming software applications before they may be executed or provided on the remote device. In some such scenarios, the hub application may be configured to automatically download asset libraries for some or all of the software applications that may be accessed therethrough once the hub application is launched, e.g., after the hub application is launched for the first time after installation of the hub application. In some such implementations, the hub application may be configured to download asset libraries in a particular default order to increase the chance of any randomly selected software application of the plurality of software applications being ready to be executed, e.g., have all associated asset libraries downloaded, at any given time. One such example default order may prioritize download of the asset libraries associated with the greater numbers of software applications over asset libraries associated with lesser numbers of asset libraries. Another example default order may rank the asset libraries by the product of the asset library size multiplied by the number of software applications associated with that asset library; the asset libraries having larger such products may be prioritized over asset libraries having lower such products. In other implementations, there may be no default download of asset libraries and such downloads may instead occur in response to various user actions, such as an explicit request to download the asset libraries associated with a particular software application, e.g., such as in response to the indication of block 802. It should be noted that the indication of block 802 may be received while no asset libraries are being downloaded to the remote device or, alternatively, while one or more asset libraries are being downloaded to the remote device, e.g., in response to a default download order or in response to an earlier indication of a different selected software application.

Regardless of the context in which the indication of the selected software application of block 802 is received, in block 804, a determination may be made as to the set of asset libraries that are associated with the selected software application. Such a determination may be made through, for example, consultation of a manifest data structure that identifies, for the selected software application, which asset libraries are associated therewith. After the determination of block 804 has been made, the technique may proceed to block 806, in which transmission (or download) of one or more of the asset libraries associated with the selected software application may be prioritized over transmission (or download) of asset libraries that are not associated with the selected software application. In some implementations, such prioritization may be implemented such that a pending download/transmission to the remote device of an asset library or libraries that are not associated with the selected software application is allowed to complete before starting a subsequent transmission or download of an asset library that is associated with the selected software application. In other implementations, however, such prioritization may be implemented such that the download or transmission of asset libraries that are not associated with the selected software application may be interrupted or paused to allow for download or transmission of the asset library or asset libraries for the selected application to be downloaded or transmitted faster to the remote device.

Such prioritization schemes may increase the speed with which the selected software application is downloaded or transmitted to the remote device, thereby reducing the delay between whatever caused the indication of the selected software application, e.g., a user indication that they wished to execute the selected software application, and the point at which the selected software application is actually able to be executed on the remote device. It should be noted that in some instances, a particular software application may be executable before all of the asset libraries associated with that software application have been downloaded, in which case the remaining associated asset libraries may be downloaded after execution of the selected software application has begun.

Thus, the techniques herein may not only decrease the total amount of information to be downloaded (thus decreasing the total amount of time needed to provision a remote device with the information needed to run those software applications) for a plurality of software applications by consolidating assets used by those software applications into asset libraries such as are described above, but may also be used to prioritize the transmission or download of such asset libraries to reduce the amount of time needed to render a given software application ready to be executed on a remote device. This avoids potentially wasting download bandwidth and/or download time on assets that are not associated with the given software application.

A further technique that may be implemented using application-associated asset libraries such as those discussed above is discussed below with respect to FIG. 9. FIG. 9 is a flow diagram for a technique for providing packaged assets for multiple software applications to a remote device.

Figure 9:
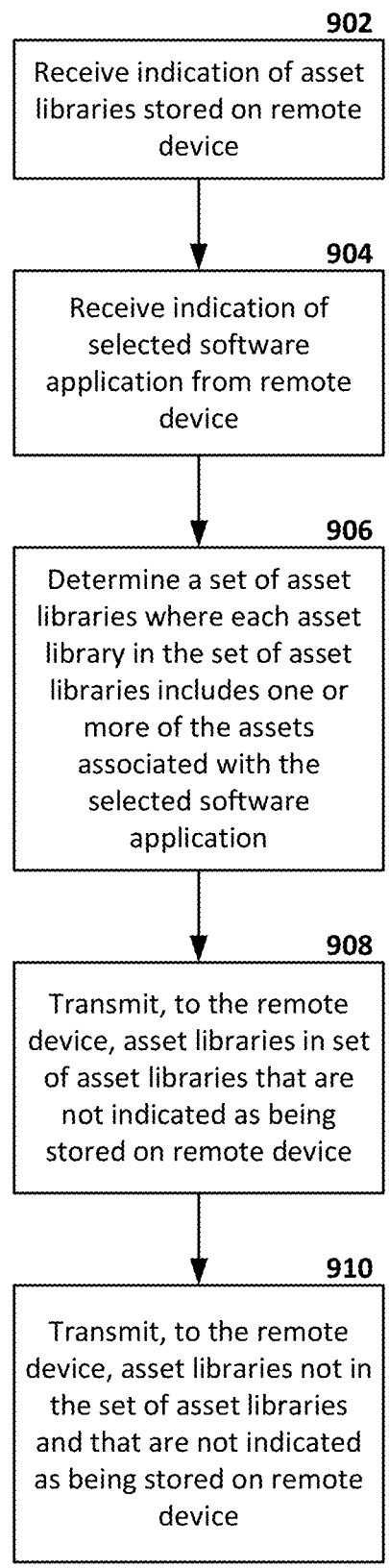
FIG. 9 is a flow diagram for a technique for providing packaged assets for multiple software applications to a remote device.

In block 902 of FIG. 9, an indication may be received of asset libraries that are already stored on a remote device. Such an indication may be received at the remote device, e.g., code executing on the remote device may inventory the asset libraries (or assets) that are stored on the remote device and make the inventory available to one or more processors of the remote device, or may be received at a distribution system, e.g., a server, that may provide asset libraries for download to the remote device.

In block 904, another indication may be received. This additional indication (which may be received before, after, or contemporaneously with the indication of block 902) may indicate a selected software application that is to be executed on the remote device, e.g., an indication such as discussed with regard to block 802 in FIG. 8.

In block 906, a determination may be made as to a set of asset libraries that are associated with the selected software application. Such a determination may be made through, for example, consultation of a manifest data structure that identifies, for the selected software application, which asset libraries are associated therewith. This determination may, for example, be similar to that made in block 804 of FIG. 8.

In block 908, the asset libraries that are in the set of asset libraries determined in block 906 and that are not already indicated as being stored on the remote device may be transmitted to the remote device. This avoids re-transmitting asset libraries that are already present on the remote device, thus wasting bandwidth, and shortens the delay between the receipt of the indication of the selected software application and the point at which the selected software application has sufficient files stored on the remote device that it may be able to be executed on the remote device.

In block 910, which may be optionally performed, additional asset libraries that are not in the set of asset libraries from block 906 and that are not already stored on the remote device may be caused to be transmitted or downloaded to the remote device, thus allowing further software applications to be rendered executable on the remote device. Block 910 may be performed after block 908 in some implementations to allow the selected software application of block 904 to be executable in a reduced window of time.

Figure 10:
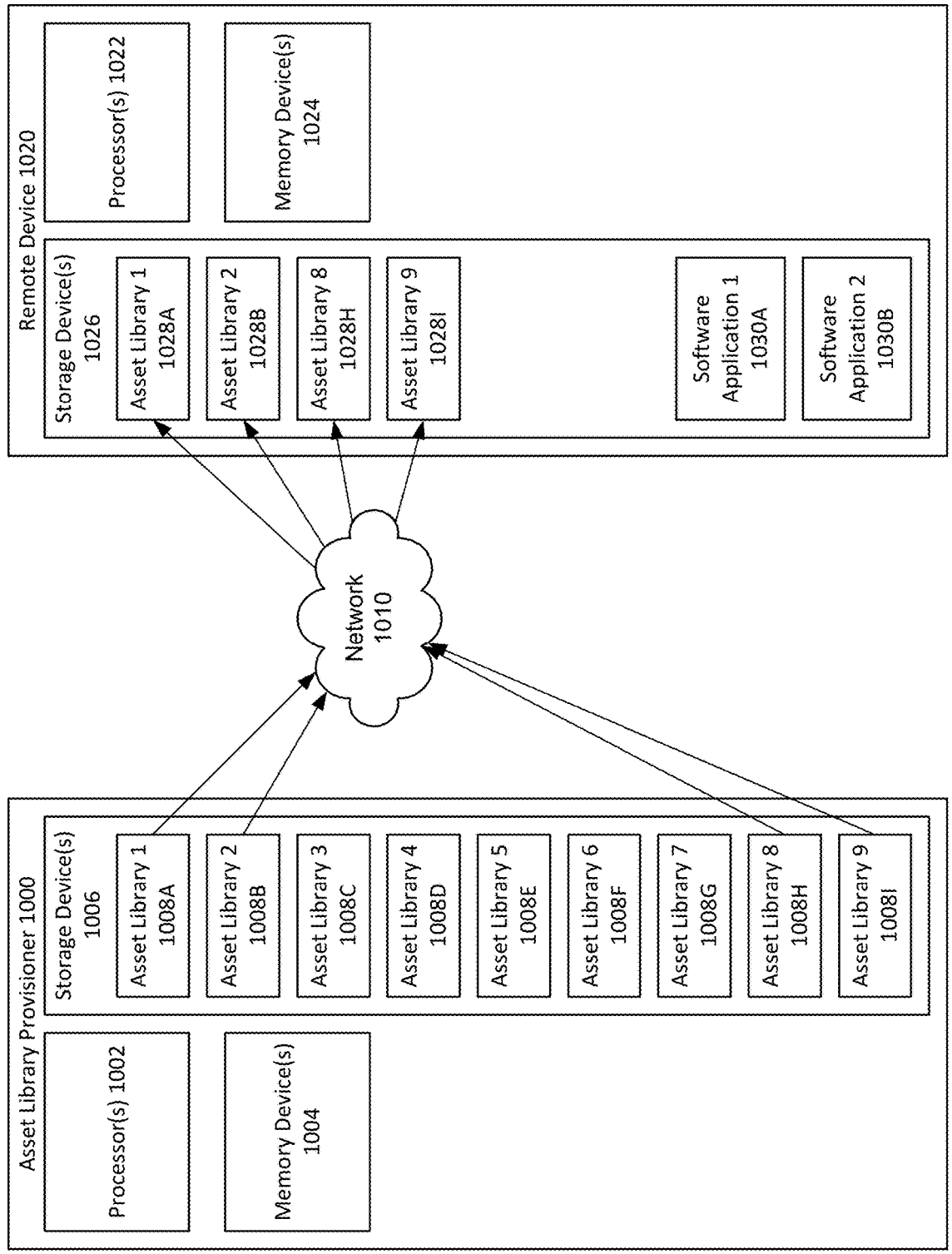
FIG. 10 depicts an example system for distributing asset libraries according to this disclosure.

It will be understood that the techniques discussed above may be practiced in the context of a variety of different systems and devices. FIG. 10 depicts one such example system, although other systems and devices will be apparent.

In FIG. 10, an asset library provisioner 1000 is provided that includes one or more processors 1002, one or more memory devices 1004, and one or more storage devices 1006. The asset library provisioner 1000 may, for example, be one or more network servers, cloud servers, or other computing devices. The one or more storage devices 1006, which may, for example, be devices such as non-volatile disk drives, network storage drives, flash drives, etc., may be configured for long-term storage of large amounts of data, and may store, among other things, computer-executable instructions that may be loaded into one or more of the one or more memory devices 1004 and executed by the one or more processors 1002 to cause the one or more processors 1002 to perform one or more operations such as those discussed above with respect to the techniques discussed earlier. The one or more storage devices 1006 may also store a plurality of asset libraries 1008A-1008I which correspond, in this example, to the asset sets 1-9 in FIG. 5, respectively. The computer-executable instructions stored on the storage devices 1006 may include, for example, instructions for causing the one or more processors to establish a communications connection, e.g., via network 1010, with a remote device 1020, which may have its own one or more processor(s) 1022, one or more memory devices 1024, and one or more storage devices 1026 (all of which may be similar in function and nature to the processor(s) 1002, memory device(s) 1004, and storage device(s) 1006 discussed above). The storage device(s) 1026 may store computer-executable instructions for controlling the processor(s) 1022 to, for example, receive (or establish) the communications connection with the asset library provisioner 1000. The remote device 1020 may, for example, be a smartphone, tablet computing device, laptop, desktop, gaming console, or other device.

In some implementations, the remote device 1020 may be configured to provide information to the asset library provisioner 1000 that allows the asset library provisioner 1000 to make determinations as to which asset libraries should be "pushed" out to the remote device. For example, the computer-executable instructions stored on the storage device(s) 1026 may be configured to cause the processor(s) 1024 to transmit an indication to the asset library provisioner 1000 of which software application is selected by a user of the remote device 1020, and the asset library provisioner 1000 may then determine, e.g., by consulting a manifest (as discussed earlier), which asset libraries 1008 should be transmitted to the remote device 1020 to provide the desired software application.

In other implementations, the remote device 1020 may be equipped to make such determinations, e.g., the remote device 1020 may have access to information, e.g., the manifest discussed above, that indicates which asset libraries 1008 are needed to provide for proper execution of a desired software application. In this case, the remote device 1020 may simply send a request to the asset library provisioner 1000 indicating which asset libraries 1008 are to be transmitted.

In FIG. 10, the asset libraries 1028A, 1028B, 1028H, and 1028I, corresponding to asset libraries 1008A, 1008B, 1008H, and 1008I, respectively, have been received by the remote device 1020 via the network 1010, thereby rendering software application 2 1030B (from FIG. 5) ready to be executed by the processor(s) 1022 of the remote device 1020. As can be seen, software application 1 1030A and software application 2 1030B are also stored on the storage device(s) 1026; such software applications may already be present on the remote device 1020 or may, themselves, be packaged in an asset library or libraries and subjected to the same techniques discussed above.

Similarly, if there are existing asset libraries already present on the remote device 1020, then the determination as to which asset libraries should still be downloaded may be made either by the processor(s) 1022 of the remote device 1020 or by the processor(s) 1002 of the asset library provisioner 1000.

In some implementations, one or more software applications may share a core software engine and may only differ in terms of configuration and graphical/audio content, in which case each software application, as discussed herein, will be understood to refer to the totality of the core software engine combined with the assets used thereby. For example, in some implementations, a core software application for providing slot machine games may be provided on a remote device; this core software application may be designed to be quite flexible, allowing for different configurations of slot machine games to be generated and displayed on a display device. For example, one or more configuration files for such a core software application may allow for customization of the payouts, number of reels, number of reel symbols visible at one time, chances of winning, bonus options, bonus games, etc. Furthermore, different assets may be used by the core software application depending on the configuration used when executing the core software application, e.g., different graphical and audio assets may be used for a slot machine game executed using one set of configuration files as compared with a slot machine game executed using another set of configuration files.

It is to be understood that the phrase "for each <item> of the one or more <items>" or "for each <item> in the set of one or more <items>," if used herein, should be understood to be inclusive of both a single-item groups or sets and multiple-item groups or sets, i.e., the phrase "for . . . each" is used in the sense that it is used in programming languages to refer to each item of whatever population or set of items is referenced. For example, if the population or set of items referenced is a single item, then "each" would refer to only that single item (despite the fact that dictionary definitions of "each" frequently define the term to refer to "every one of two or more things") and would not imply that there must be at least two of those items. Similarly, if words suggesting a plurality, such as "all," "first," "last," are used in conjunction with a group or set that is indicated as potentially having a single member, it is to be understood that the use of such words does not imply that there necessarily multiple such members. For example, if a "set of one or more items all have the same characteristic X," this is to be understood to mean that the item in a single-item instance of such a set has characteristic X and that all of the items in a multiple-item instance of such a set have characteristic X.

While the invention has been described with respect to the Figures, it will be appreciated that many modifications and changes may be made by those skilled in the art without departing from the spirit of the invention. Any variation and derivation from the above description and Figures are included in the scope of the present invention as defined by the claims.

What is claimed is:

1. A system comprising:
one or more processors; and
one or more storage devices, wherein:
the one or more processors and the one or more storage devices are operably connected, and
the one or more storage devices store computer-executable instructions for controlling the one or more processors to:
identify, for each asset of a plurality of assets that are associated with one or more gaming software applications of a plurality of different gaming software applications, a set of one or more of the gaming software applications with which that asset is associated, wherein at least one of the assets is associated with two or more of the gaming software applications;
group the assets in the plurality of assets into a plurality of sets of assets, wherein:
each set of assets is associated with a corresponding set of one or more gaming software applications,
each set of assets includes one or more assets,
at least a first set of assets of the plurality of sets of assets includes at least one asset and is associated with a corresponding set of two or more gaming software applications, and
the asset or assets in each set of assets is or are all associated with the corresponding set of one or more of the gaming software applications for that set of assets; and
package the one or more assets for each set of assets into a corresponding asset library.

2. The system of claim 1, wherein the one or more storage devices further store computer-executable instructions for further controlling the one or more processors to:
receive a first indication from a remote device of a selected gaming software application of the plurality of different gaming software applications;
identify a set of the asset libraries, wherein the asset libraries that are in the set of the asset libraries each include one or more of the assets that are associated with the selected software application; and
prioritize transmission to the remote device of one or more of the asset libraries in the set of the asset libraries over transmission to the remote device of the asset libraries that are not in the set of the asset libraries.

3. The system of claim 2, wherein the one or more storage devices further store computer-executable instructions for further controlling the one or more processors to:
receive a second indication from the remote device of asset libraries that are stored on the remote device; and
cause the asset libraries in the set of the asset libraries that are not indicated by the second indication as being stored on the remote device to be transmitted to the remote device.

4. The system of claim 3, wherein the one or more storage devices further store computer-executable instructions for further controlling the one or more processors to:
cause the asset libraries in the set of the asset libraries that are not indicated by the second indication as being stored on the remote device and that are associated with one or more of the gaming software applications other than the selected gaming software application to be transmitted to the remote device.

5. The system of claim 1, wherein each asset is selected from the group of: graphics, textures, audio, text, font information, video, and haptic feedback definitions.

6. The system of claim 1, wherein the computer-executable instructions for controlling the one or more processors to package the one or more assets for each set of assets into the corresponding asset library include computer-executable instructions for controlling the one or more processors to compress the one or more assets for that set of assets as part of the packaging of the one or more assets for that set of assets into the corresponding asset library.

7. A non-transitory, computer-readable storage medium storing computer-executable instructions for controlling one or more processors to:
identify, for each asset of a plurality of assets that are associated with one or more gaming software applications of a plurality of different gaming software applications, a set of one or more of the gaming software applications with which that asset is associated, wherein at least one of the assets is associated with two or more of the gaming software applications;
group the assets in the plurality of assets into a plurality of sets of assets, wherein:
each set of assets is associated with a corresponding set of one or more gaming software applications,
each set of assets includes one or more assets,
at least a first set of assets of the plurality of sets of assets includes at least one asset and is associated with a corresponding set of two or more gaming software applications, and
the asset or assets in each set of assets is or are all associated with the same set of one or more of the gaming software applications for that set of assets; and
package the one or more assets for each set of assets into a corresponding asset library.

8. The non-transitory, computer-readable storage medium of claim 7, storing further computer readable instructions for further controlling the one or more processors to:
receive a first indication from a remote device of a selected gaming software application of the plurality of different gaming software applications;
identify a set of the asset libraries, wherein the asset libraries that are in the set of the asset libraries each include one or more of the assets that are associated with the selected gaming software application; and
prioritize transmission to the remote device of one or more of the asset libraries in the set of the asset libraries over transmission to the remote device of the asset libraries that are not in the set of the asset libraries.

9. The non-transitory, computer-readable storage medium of claim 8, storing further computer readable instructions for further controlling the one or more processors to:
receive a second indication from the remote device of asset libraries that are stored on the remote device; and
cause the asset libraries in the set of the asset libraries that are not indicated by the second indication as being stored on the remote device to be transmitted to the remote device.

10. The non-transitory, computer-readable storage medium of claim 9, storing further computer readable instructions for further controlling the one or more processors to:
cause the asset libraries in the set of the asset libraries that are not indicated by the second indication as being stored on the remote device and that are associated with one or more of the gaming software applications other than the selected gaming software application to be transmitted to the remote device.

11. The non-transitory, computer-readable storage medium of claim 7, wherein each asset is selected from the group of: graphics, textures, audio, text, font information, video, and haptic feedback definitions.

12. The non-transitory, computer-readable storage medium of claim 7, wherein the computer-executable instructions for controlling the one or more processors to package the one or more assets for each set of assets into the corresponding asset library include computer-executable instructions for controlling the one or more processors to compress the one or more assets for that set of assets as part of the packaging of the one or more assets for that set of assets into the corresponding asset library.

13. A method comprising:
identifying, for each asset of a plurality of assets that are associated with one or more gaming software applications of a plurality of different gaming software applications, a set of one or more of the gaming software applications with which that asset is associated, wherein at least one of the assets is associated with two or more of the gaming software applications;
grouping the assets in the plurality of assets into a plurality of sets of assets, wherein:
each set of assets is associated with a corresponding set of one or more gaming software applications,
each set of assets includes one or more assets,
at least a first set of assets of the plurality of sets of assets includes at least one asset and is associated with a corresponding set of two or more gaming software applications, and
the asset or assets in each set of assets is or are all associated with the corresponding set of one or more of the gaming software applications for that set of assets; and
packaging the one or more assets for each set of assets into a corresponding asset library.

14. The method of claim 13, further comprising:
receiving a first indication from a remote device of a selected gaming software application of the plurality of different gaming software applications;
identifying a set of the asset libraries, wherein the asset libraries that are in the set of the asset libraries each include one or more of the assets that are associated with the selected gaming software application; and
prioritizing transmission to the remote device of one or more of the asset libraries in the set of the asset libraries over transmission to the remote device of the asset libraries that are not in the set of the asset libraries.

15. The method of claim 14, further comprising:
receiving a second indication from the remote device of asset libraries that are stored on the remote device; and
causing the asset libraries in the set of the asset libraries that are not indicated by the second indication as being stored on the remote device to be transmitted to the remote device.

16. The method of claim 15, further comprising:
causing the asset libraries in the set of the asset libraries that are not indicated by the second indication as being stored on the remote device and that are associated with one or more of the gaming software applications other than the selected gaming software application to be transmitted to the remote device.

17. The method of claim 13, wherein each asset is selected from the group of: graphics, textures, audio, text, font information, video, and haptic feedback definitions.

18. The method of claim 13, wherein packaging the one or more assets for each set of assets into the corresponding asset library includes compressing the one or more assets for that set of assets as part of the packaging for that set of assets into the corresponding asset library.

* * * * *